Aug. 11, 1970  R. P. VAN DRIESEN ETAL  3,523,763
CATALYTIC REACTOR
Filed Sept. 28, 1967
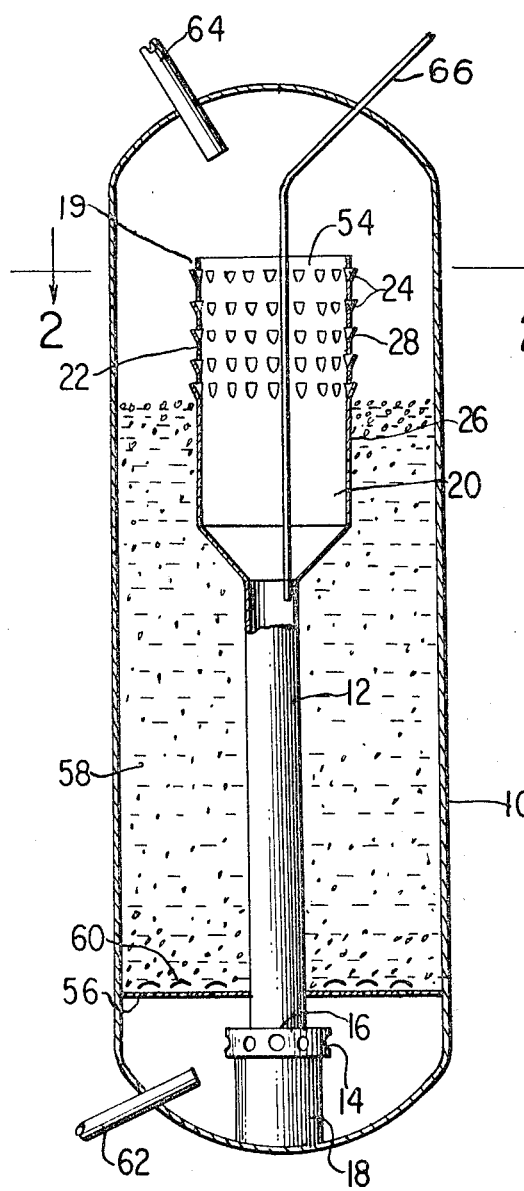
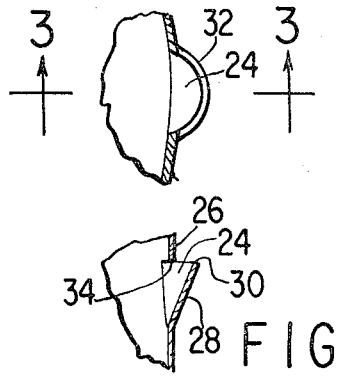
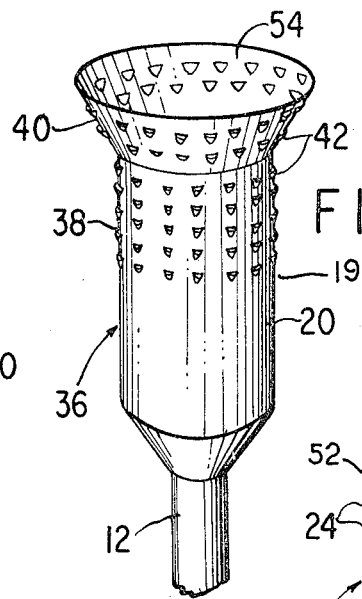
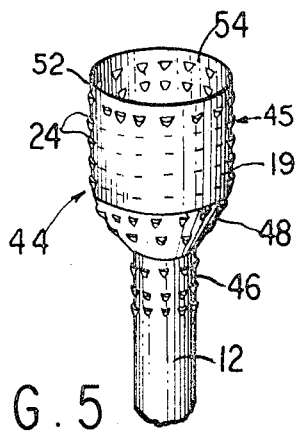
INVENTORS
ROGER P. VAN DRIESEN
NORMAN C. STEWART
BY EDMUND W. WHITE
ATTORNEY United States Patent Office 3,523,763
Patented Aug. 11, 1970

3,523,763
CATALYTIC REACTOR
Roger P. Van Driesen, Hopewell, N.J., Norman C. Stewart, Lake Charles, La., and Edmund W. White, Silver Spring Md., assignors to Cities Service Research and Development Company, New York, N.Y., a corporation of Delaware
Filed Sept. 28, 1967, Ser. No. 671,367
Int. Cl. B01j 9/06, 9/20; B01d 45/08
U.S. Cl. 23—288                                      7 Claims

ABSTRACT OF THE DISCLOSURE

Catalytic hydrocarbon reactor apparatus comprising a reaction vessel, means for introducing feedstock reactant fluids such as liquids and gas and particulate catalyst solids into the vessel together with means for removing the products, and an internally mounted vertical open ended recycle conduit with a centifugal pump at the bottom of the conduit and having a funnel shaped head portion extending into the top portion of the reaction vessel, the extended outside wall of the funnel shaped head portion having a multiplicity of vertical scalloped shaped protrusions with small openings in the tops thereof to effectuate improved gas liquid disengagement.

BACKGROUND OF THE INVENTION

This invention relates to an apparatus for treating hydrocarbon oils with catalyst, said apparatus having an improved recycle conduit.

Treating hydrocarbon oils in the presence of various catalysts and under varying conditions for purposes of obtaining conversion reactions such as hydrogenation, cracking, reforming are generally well known in the art. Most of these prior processes such as the hydrogenation of hydrocarbon oils have involved circulating the feed oil through a fixed bed of catalyst in the presence of hydrogen and under conditions of temperature and pressure adapted to effect the desired reaction. Additionally, in order to obtain a more complete yield of the feedstock it has been common practice to recycle a portion of the reactants which have passed through the catalytic bed into the reactor once more. A common recycle means has been to provide an internal recycle conduit vertically located within the catalytic reactor through which converted portions pass back down the conduit and into the bed of the reactor again. Inherent in such an internal recycle conduit is the problem of separating that portion of the reactants converted to the desired products from that portion requiring additional treatment by recycling. Additionally, fixed bed operations suffer from various disadvantage such as the channeling of the liquid feed through the bed, non-uniform heating of the catalyst bed and the inability to withdraw the spent catalyst from the reactor.

To cope with the disadvantages of the fixed bed operation, a process has been devised in which the catalyst and liquid feed have been passed through the reaction zone together at sufficient rate so that the catalyst in the bed is expanded into a state of agitated motion. This has been identified as the ebullated bed type of process. While avoiding the disadvantage of fixed bed operation and constituting substantial improvement over the prior art, these processes still suffer from certain difficulties in the use of the ebullated process type reactor with an internal recycle conduit. Thus, it has been found that the entrainment of gas can be excessive. This slows the mass rate through the pump. More important when liquid product is pulled this way too much gas is lost from the high pressure system. Such difficulties also tend to exist in apparatus having a funnel shaped intake for recycling a portion of the reactant liquid into internal conduit and feeding into the input of centrifugal pump located in the bottom of the reactor.

In the latter apparatus when trying to effectuate a separation of the product at times, the density of the liquid-gas mixture was so low that undesirably high disengagement space in the top portion of the reactor was required while gas entrainment in the liquid product was also undesirably high. Additionally, such apparatus may on occassion carry the catalyst into the recycle pump which may accumulate beneath the distributor grids and possibly plug them.

SUMMARY OF THE INVENTION

This invention encompasses a catalytic reactor having an internal liquid recycle conduit, the recycle conduit comprising a top portion having a gas disengagement head with a vertical and/or diverging conduit extension at the top of the disengaging head, said conduit extension having a multiplicity of holes such as provided by slots, mesh or screens, but more particularly formed by lips of protrusions on the outside of the extension whereby gas will tend to deflect and more important to coalesce on the openings and not flow into the conduit through the holes thereby effectuating improved gas disengagement from liquid and allowing asphaltenes or fines to pass into the recycle conduit.

It is therefore an object of this invention to provide an apparatus having an improved recycle conduit internally located in a catalytic reactor.

Another object of this invention is to provide an improved recycle conduit having superior gas-liquid separation.

It is yet another object of this invention to provide a gas disengagement head for a recycle conduit internally located in a catalytic reactor which allows passage of recycle liquid of asphaltenes and fines yet tends to separate gas entrained therein.

Other objects and advantages of this invention will become apparent to those skilled in the art from the drawings and description of the preferred embodiments which follow.

BRIEF DESCRIPTION OF THE DRAWING

FIG. 1 is a vertical cut-away view of a catalytic reactor showing an improved internal recycle conduit according to this invention;

FIG. 2 is a top view of the protrusion taken along line 2—2 of FIG. 1 showing one of the protrusions on the conduit head;

FIG. 3 is a vertical cross-section taken along section 3—3 of FIG. 2 showing one of the multiplicity of passages.

FIG. 4 is a view of the head with a second version of the improvement according to this invention; and FIG. 5 shows another embodiment of this invention as applied to replace the gas disengagement head of the recycle conduit.

BRIEF DESCRIPTION OF THE PREFERRED EMBODIMENT

As shown in FIG. 1, the reactor 10 for hydrocarbon oil treatment as by catalytic cracking, reforming, hydrogenation, or other similar reaction processes is preferably a vertical cylindrical vessel having in internally mounted recycle conduit 12 vertically supported within said reactor 10. The recycle conduit 12 is a cylindrical tube vertically mounted and having an open top and bottom.

A horizontally mounted centrifugal pump 14 is attached to the bottom of the recycle conduit and has as its inlet 16, the bottom outlet of the recycle conduit. A pump motor 18 which may be either gas, hydraulic or electrically powered is mounted on the bottom of the reactor vessel with the motor shaft being vertical so as to drive the centrifugal pump 14. While the preferred embodiment of the apparatus according to this invention utilizes a recycle conduit with a pump there is no reason why the invention may not be used in a reaction vessel having a recycle conduit but lacking an internal pump.

The top of the recycle conduit is flared outwardly to provide a funnel shaped wide mouth pan 20 which is located above the usual operating level of the catalyst and in the prior art serves as a gas entrainment separator or disengagement head. In the present invention a disengagement head 19 extends above the pan 20 and is contiguous with the top of the pan 20. The disengagement head 19 comprises a vertical walled cylindrical pan extension 22 continuous with the pan 20, and having a multiplicity of passages 24 through the wall 26 of the pan extension 22. The passages 24 may be of any shape or form such as round or square holes of from $\frac{1}{64}$ inch to $\frac{1}{4}$ inch across or a mesh of perforated screen from about 100 mesh to about 20 mesh. The passages 24 allow portions of the reactant liquid to flow through into the recycle conduit pan while causing gas bubbles to coalesce and separate from the liquid flow. Additionally, the change in direction of the liquid flow from vertically upward to horizontal to vertically downward tends to separate out the entrained gas in the liquid. The small passages 24 will by viscosity and surface tension also retard gas flow (through the passages) while allowing liquid to flow into the recycle conduit. Thus, improved liquid-gas disengagement, together with prevention of solid particle entry into the recycle conduit is effected by the disengagement head 19.

A preferred type of passage 24 as generally shown in FIG. 1 is more particularly described with reference to FIGS. 2 and 3 showing cross sections of one of the passages. With reference to FIG. 3 wherein a vertical cross section of the pan extension wall across section 2—2 is shown as a small scalloped out protrusion 28 progressively jutting out from the side of the pan wall 26. The protrusion 28 forms a lip 30 as the convex edge 32 of one of the passages 24 shown by FIG. 2 thereby forming a semi-circular shaped passage 24 with the bottom edge 34 of the wall 26 serving as the remaining border of the passage. The radius of the semi-circular passage formed by edge 32 is from about $\frac{1}{64}$ inch to about $\frac{1}{4}$ inch, but preferably between about $\frac{1}{32}$ inch and about $\frac{3}{32}$ inch. The base of the semi-circular passage is from about $\frac{1}{16}$ inch to about 1 inch but preferably is between about $\frac{1}{8}$ inch and $\frac{3}{8}$ inch. As the wall of the protrusion is diverging outward, any solid particles coming into contact with such protrusion wall will tend to fall back into the reactor mass rather than adhere to the wall of the pan extension, while additionally aiding solid-liquid disengagement by the flow below the passages 22.

Another version of an improved recycle conduit 36 according to this invention is shown in FIG. 4 of the drawings showing the disengagement head 19 end top portion only of the recycle conduit. In addition to a vertical cylindrical pan extension 38 having a multiplicity of passages 24 as in the gas disengagement head 19 shown in FIG. 1, a funnel shaped outwardly diverging extension 40 is mounted atop and contiguous with the cylindrical pan extension 38. The diverging extension 40 has a multiplicity of passages 42 which may be of the same size and shape of the passages 24 or may be different, so that the lower cylindrical pan extension 38 may have protrusion with scalloped passages as in FIGS. 1 through 3 or may be formed by the diverging pan extension being slotted, perforated or manufactured from wire mesh or grating.

With reference to FIG. 5 another embodiment of an improved recycle conduit 44 of this invention is shown where the prior art gas disengagement head is replaced by a similarly shaped sieved funnel 45 having a multiplicity of passages 24 similar in structure to the aforementioned protrusions and passages. The sieved funnel comprises a vertical tubular wall 46 coextensive and contiguous with the lower tubular wall of the recycle conduit 44, a diverging frusto-conicular shaped wall 48 having a lower edge abutting and fixedly attached to the top of vertical tubular wall 46 and a vertical rim extension 52 attached to the top rim of the diverging frusto-conicular shaped wall 48, the vertical tubular wall 46, the diverging frusto-conicular wall 48 and the vertical rim extension 52 all having a multiplicity of passages 24 as previously described.

All of the aforementioned embodiments of the improved recycle conduit form a wide mouth opening 54 in the top end of the recycle conduit through which heavy liquid, asphaltenes, and catalyst fines may pass into the recycle conduit even if a portion of the passages are plugged. Thus, no shutdown of the reactor will readily occur allowing operation to be continued as with the prior art recycle conduit.

Additionally, the reactor is equipped with a perforated tray 56 transversely mounted in the lower portion of the vessel and which acts as a support for the catalyst bed 58. A multiplicity of bubble caps 60 are mounted on the perforated tray in a suitable manner to permit reactant fluid to flow upwardly through the tray and into the catalyst bed. Finally, a feed and reactant supply conduit 62 passes feedstock, fluid reactant, and the like into the bottom portion of the reactor vessel 10. Gaseous product is removed from the reactor vessel by an outlet conduit 64 extending into the top portion of the reactor vessel 10.

Liquid may be withdrawn from the reactor through liquid withdrawal conduit 66 which extends into the recycle conduit to approximately just below the pan. Although only one feed conduit and two outlets are shown, it should be understod that several such inlets and outlets can be used and such uses are well known to those skilled in the art.

When the apparatus of this invention is employed it is found that the disengagement height can be reduced by as much as 60% of the height required by the prior art reactor wherein the perforated extension is not employed. Additionally, the hydrogen loss when employing the apparatus of this invention is reduced by as much as 37% and more over that obtained by the prior art apparatus.

While the invention has been described above in connection with specific preferred embodiments, it will be understood by those skilled in the art to cover those various changes and modifications which may be made without departing from the spirit and scope of the invention.

We claim:
1. An apparatus for treating fluids of varying density, said apparatus comprising:
   (a) a reactor vessel;
   (b) means for introducing reactants and catalyst into the vessel;
   (c) means for moving product; and
   (d) a vertically mounted conduit fixedly mounted within the reactor vessel, said conduit having an open top and a head communicatingly mounted on the top of the conduit, said head having a multiplicity of small passages and scalloped protrusions diverging outwardly from the sides, said protrusions each having one of said small passages through the top side thereof, whereby denser fluids tend to separate from the lighter fluids and pass through the passages into the conduit.

2. The apparatus of claim 1 wherein the conduit head is funnel shaped and has diverging sides.

3. The apparatus of claim 2 wherein the conduit head additionally comprises;
   a vertically walled cylindrically shaped extension fixedly and communicatingly attached to the top end of the funnel shaped head, said extension having a multiplicity of small passages through the walls thereof.

4. The apparatus of claim 3 wherein the conduit head additionally comprises;
a second frusto-conicular diverging extension fixedly mounted on and communicatingly attached to the top of the vertical walled cylindrically shaped extension, said second diverging extension also having a multiplicity of small passages.

5. The apparatus of claim 1 wherein the conduit top has a multiplicity of small passages through the sides thereof and the head is a wide mouth funnel communicatingly mounted atop said top and diverging therefrom.

6. An apparatus for treating fluids of varying density, said apparatus comprising:
a reactor vessel;
means for introducing fluids into said vessel;
means for removing product from said vessel;
a vertical open-ended recycle conduit fixedly mounted in said vessel, said recycle conduit having a funnel shaped extension at the top and a head communicatingly mounted on the top of recycle conduit and having a multiplicity of small scalloped protrusions diverging outwardly from the sides, the top of each of said protrusions having a passage therethrough formed by the convex edges of the protrusion and the side of the head opposite the convex edge, said head comprising a vertical cylindrically shaped extension communicatingly attached to the top end of the recycle conduit top funnel shaped extension, and a second frusto-conicular diverging extension fixedly and communicatingly attached to the top of the vertical cylindrically shaped head extensions.

7. The apparatus of claim 6 which additionally comprises;
(a) a perforated tray having a multiplicity of bubble caps horizontally mounted in the lower portion of the reactor vessel outside of and surrounding the lower portion of the recycle conduit;
(b) a centrifugal pump having a vertical axis and horizontally mounted beneath the lower portion of the recycle conduit said centrifugal pump having an inlet communicatingly attached to the lower end of the recycle conduit and a plurality of pump outlets circumferentially located on the pump, said outlets communicating with the reactor vessel portion below the perforated tray.

References Cited
UNITED STATES PATENTS

| | | | |
|---|---|---|---|
| 2,886,517 | 5/1959 | Patton et al. | 23—288 X |
| 3,188,286 | 6/1965 | Van Driesen | 23—288.3 X |
| 3,197,288 | 7/1965 | Johanson | 23—288.3 X |
| 3,227,528 | 1/1966 | Jaeger | 23—288.3 X |

MORRIS O. WOLK, Primary Examiner

D. G. CONLIN, Assistant Examiner

U.S. Cl. X.R.

23—284, 285; 55—474